US012695715B2

(12) United States Patent
Chen et al.

(10) Patent No.: US 12,695,715 B2
(45) Date of Patent: Jul. 28, 2026

(54) OBJECT OPERATION METHOD, ELECTRONIC DEVICE AND STORAGE MEDIUM

(71) Applicant: Beijing Zitiao Network Technology Co., Ltd., Beijing (CN)

(72) Inventors: Jiesheng Chen, Beijing (CN); Haiyun Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 36 days.

(21) Appl. No.: 18/838,603

(22) PCT Filed: Feb. 9, 2023

(86) PCT No.: PCT/CN2023/075109
§ 371 (c)(1),
(2) Date: Aug. 14, 2024

(87) PCT Pub. No.: WO2023/155725
PCT Pub. Date: Aug. 24, 2023

(65) Prior Publication Data
US 2025/0158946 A1 May 15, 2025

(30) Foreign Application Priority Data

Feb. 16, 2022 (CN) .......................... 202210140943.9

(51) Int. Cl.
*G06F 15/16* (2006.01)
*H04L 51/04* (2022.01)
(Continued)
(52) U.S. Cl.
CPC .............. *H04L 51/10* (2013.01); *H04L 51/04* (2013.01); *H04L 51/224* (2022.05); *H04L 51/23* (2022.05)

(58) Field of Classification Search
CPC ....... H04L 51/10; H04L 51/23; H04L 51/224; H04L 51/04
(Continued)

(56) References Cited

U.S. PATENT DOCUMENTS

2011/0137797 A1* 6/2011 Stals ...................... G06Q 20/20
705/44
2014/0201289 A1 7/2014 Wheeler et al.
(Continued)

FOREIGN PATENT DOCUMENTS

CN 101163118 A 4/2008
CN 103186383 A 7/2013
(Continued)

OTHER PUBLICATIONS

International Patent Application No. PCT/CN2023/075109; Int'l Search Report; dated Jun. 5, 2023; 2 pages.
(Continued)

*Primary Examiner* — Kaylee J Huang
(74) *Attorney, Agent, or Firm* — BakerHostetler

(57) ABSTRACT

Embodiments of the disclosure disclose an operation method for an object, an operation apparatus for an object, an electronic device, and a storage medium, and the method is applied to a first client and includes: performing a first operation on a first object of the first client in response to a preset event; reporting an effective message to a server in response to the performing of the first operation taking effect, to trigger the server to generate a notification message, and trigger the notification message to be sent to the first client and at least one second client that is in real-time communication with the first client, to enable the at least one second client to perform the first operation on the first object; and in response to receiving the notification message, maintaining the first operation that has taken effect.

20 Claims, 10 Drawing Sheets

Performing a first operation on a first object of the first client in response to a preset event ⟶ S110

Reporting an effective message to a server in response to the performing of the first operation taking effect, to trigger the server to generate a notification message, and trigger the notification message to be sent to the first client and at least one second client that is in real-time communication with the first client, to enable the first client to maintain the first operation that has taken effect, and to enable the at least one second client to perform the first operation on the first object ⟶ S120

(51) Int. Cl.
    *H04L 51/10*          (2022.01)
    *H04L 51/224*      (2022.01)
    *H04L 51/23*        (2022.01)

(58) Field of Classification Search
    USPC ................................. 709/206, 204, 203, 217
    See application file for complete search history.

(56)                   References Cited

U.S. PATENT DOCUMENTS

| 2017/0171280 A1* | 6/2017 | Kim ........................ G06F 16/70 |
|---|---|---|
| 2017/0337652 A1* | 11/2017 | Sarin .................... H04N 1/4493 |
| 2019/0066730 A1* | 2/2019 | Singh ..................... G06F 16/78 |

FOREIGN PATENT DOCUMENTS

| CN | 107846565 A | 3/2018 |
|---|---|---|
| CN | 110639206 A | 1/2020 |
| CN | 113163483 A | 7/2021 |
| CN | 113852843 A | 12/2021 |
| WO | WO 2018/223800 A1 | 12/2018 |
| WO | WO 2021/082584 A1 | 5/2021 |

OTHER PUBLICATIONS

China Patent Application No. 202210140943.9; Office Action; dated Sep. 3, 2025; 16 pages.

* cited by examiner

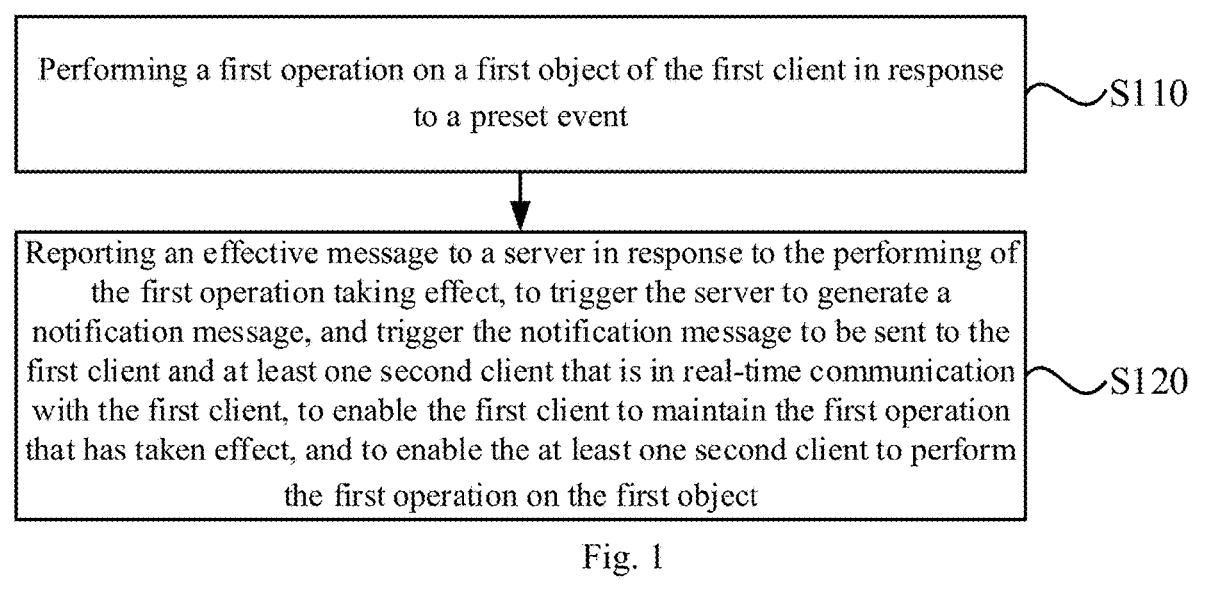

Performing a first operation on a first object of the first client in response to a preset event ⎯⎯S110

Reporting an effective message to a server in response to the performing of the first operation taking effect, to trigger the server to generate a notification message, and trigger the notification message to be sent to the first client and at least one second client that is in real-time communication with the first client, to enable the first client to maintain the first operation that has taken effect, and to enable the at least one second client to perform the first operation on the first object ⎯⎯S120

Fig. 1

OBJECT OPERATION METHOD, ELECTRONIC DEVICE AND STORAGE MEDIUM

The present application is a national phase filing of International Patent Application No. PCT/CN2023/075109 filed Feb. 9, 2023, which claims the priority to China Patent Application No. 202210140943.9 filed in China National Intellectual Property Administration on Feb. 16, 2022, the disclosures of which are incorporated herein by reference in their entireties.

TECHNICAL FIELD

Embodiments of the present disclosure relate to the field of computer technology, and for example, to an operation method for an object, an operation apparatus for an object, an electronic device, and a storage medium.

BACKGROUND

In the multi-client interaction scenarios in related technology, there is a need for multiple clients to perform mutually exclusive operations on the same object. When performing multi-terminal mutually exclusive operations based on the interactive framework in related technology, it is impossible to guarantee the order of the operation behaviors on multiple terminals, which easily leads to inconsistent object states presented by multiple terminals and seriously affects the interactive effect.

SUMMARY

The embodiments of the disclosure provide an operation method for an object, an operation apparatus for an object, an electronic device, and a storage medium, which can ensure the order of operation behaviors on multiple terminals, make the object states presented by multiple terminals consistent, and improve the interactive effect.

In a first aspect, the embodiments of the present disclosure provide an operation method for an object, which is applied to a first client and includes:

performing a first operation on a first object of the first client in response to a preset event; and reporting an effective message to a server in response to the performing of the first operation taking effect, to trigger the server to generate a notification message, and trigger the notification message to be sent to the first client and at least one second client that is in real-time communication with the first client, to enable the first client to maintain the first operation that has taken effect, and to enable the at least one second client to perform the first operation on the first object.

In a second aspect, the embodiments of the present disclosure further provide an operation apparatus for an object, which is integrated in a first client and includes:

an operation module, configured to perform a first operation on a first object of the first client in response to a preset event; and an effective message reporting module, configured to report an effective message to a server in response to performing of the first operation taking effect, to trigger the server to generate a notification message, and trigger the notification message to be sent to the first client and at least one second client that is in real-time communication with the first client, to enable the first client to maintain the first operation that has taken effect, and to enable the at least one second client to perform the first operation on the first object.

In a third aspect, the embodiments of the present disclosure further provide an electronic device, which includes:

one or more processors; and a storage apparatus, configured to store one or more programs;

and the one or more programs, when executed by the one or more processors, enable the one or more processors to implement the operation method for an object according to any one of the embodiments of the present disclosure.

In a fourth aspect, the embodiments of the present disclosure further provide a storage medium containing including computer-executable instructions, and the computer-executable instructions, when executed by a computer processor, are configured to perform the operation method for an object according to any one of the embodiments of the present disclosure.

BRIEF DESCRIPTION OF DRAWINGS

FIG. 1 is a schematic flowchart of an operation method for an object provided by an embodiment of the present disclosure;

DETAILED DESCRIPTION

Figure 2:
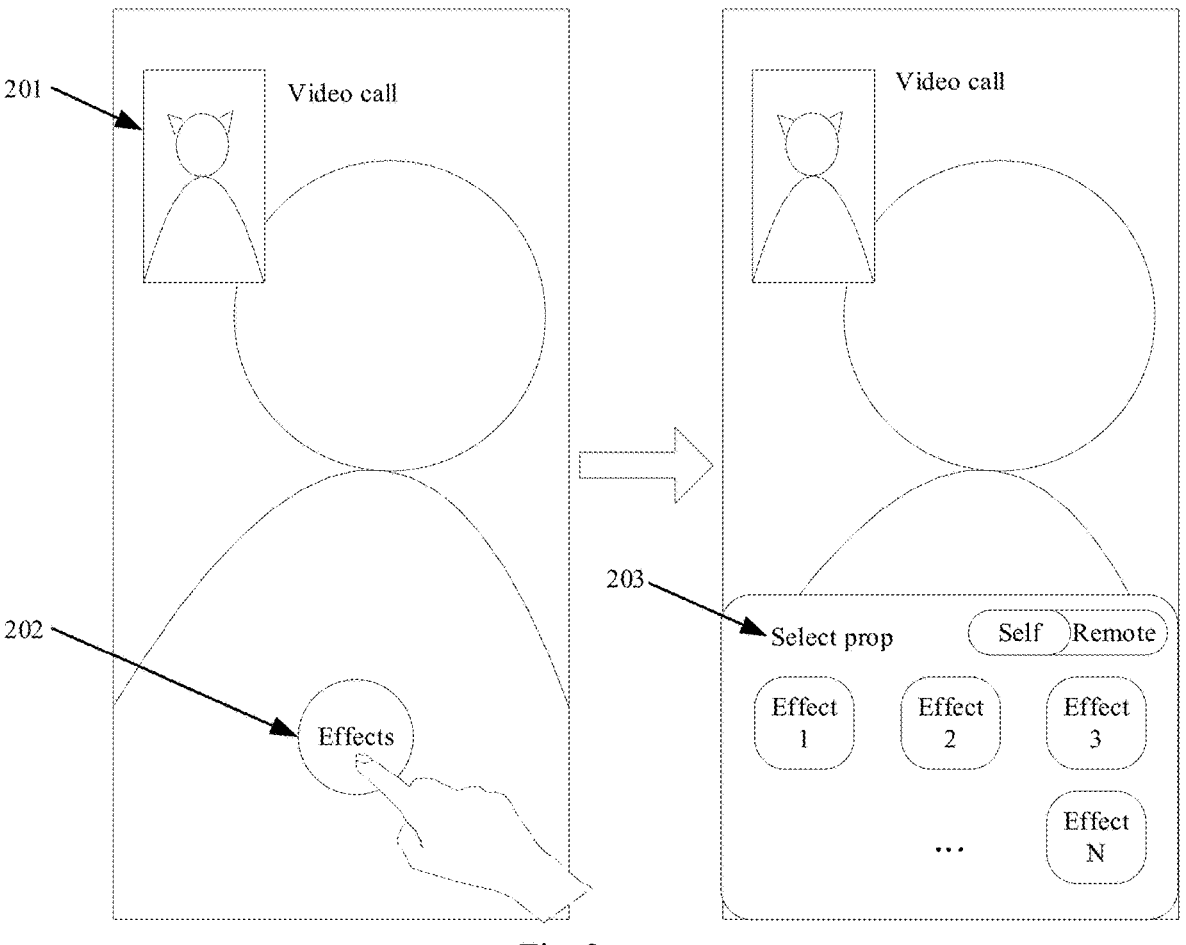
FIG. 2 is a schematic diagram of an interface of a client in an operation method for an object provided by an embodiment of the present disclosure.

It should be understood that various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be understood that concepts such as the "first," "second," or the like mentioned in the present disclosure are only used to distinguish different devices, modules or units, and are not used to limit the interdependence relationship or the order of functions performed by these devices, modules or units.

It should be understood that the modifications of "a," "an," "a plurality of," or the like mentioned in the present disclosure are illustrative rather than restrictive, and those skilled in the art should understand that unless the context clearly indicates otherwise, these modifications should be understood as "one or more."

FIG. 1 is a schematic flowchart of an operation method for an object provided by an embodiment of the present disclosure. The embodiment of the present disclosure is applicable to the situation that multiple clients perform mutually exclusive operations on the same object, for example, the situation that multiple clients add special effects to multimedia data of a certain client during the process of multimedia communication. The method may be executed by an operation apparatus for an object, which may be embodied in the form of software and/or hardware. The apparatus may be integrated with a client and installed in an electronic device with the client, such as mobile phones, computers and other electronic devices.

As shown in FIG. 1, the operation method for an object provided by the present embodiment is applied to a first client, and includes the following steps.

S110: performing a first operation on a first object of the first client in response to a preset event.

In the embodiments of the present disclosure, communication connection may be established between clients, and the object of a certain client may include communication data originating from the client, and the communication data may include but not limited to words, expressions, audio, images and videos. The client that establishes communication can present the communication data of the local terminal, and can also present the communication data of other terminals that establish communication with the local terminal, thus ensuring smooth multi-terminal communication.

For any client that is communicating in real time, the local terminal may be called the first client. The client that communicates with the local terminal in real time is called the second client; an object of the local terminal is called the first object; and an operation on the object of the local terminal is called the first operation. The first client may perform the first operation on the first object of the local terminal in response to a preset event. For example, the preset event may be an event that actively triggers an operation (for example, the local terminal inputs an instruction) or an event that passively triggers an operation (for example, receiving an instruction of the second client). It may be considered that the first client may actively perform the first operation on the first object or passively perform the first operation on the first object. Because multiple clients can trigger preset events, in order to avoid the conflict of the first operation, in the present embodiment, multiple first operations can be mutually exclusive, that is, the first object can take effect at most one first operation at the same time, and multiple first operations cannot take effect at the same time, so that multiple clients can perform mutually exclusive operations on the same object.

In an embodiment, the first client and the second client may be multimedia communication clients, which may include, for example, instant messaging clients, video conferencing clients, and the like. The first object may include multimedia data, for example, audio, video, etc. The first operation includes operations for adding special effects, such as changing voice, using effects on faces in video images, etc.

Exemplarily, FIG. 2 is a schematic diagram of an interface of a client in an operation method for an object provided by an embodiment of the present disclosure. Referring to FIG. 2, the interface of the client is an interface of video call between two users; and the video of the local user (i.e., the first object) may be presented in a box control 201 in the upper left corner of the interface, and the video of the remote user may be presented on the underlying full screen. A "effect" control 202 may be deployed in the interface, and a "select effect" window 203 may pop up in response to clicking the control 202.

Through the window 203, Effect 1-Effect N may be selected for use on the local user's (i.e., 'self' in the figure) face in the video, i.e., to perform the first operation. In addition, the window 203 may also be used to select Effect 1-Effect N for use on the remote user's (i.e., 'remote' in the figure) face in the video, and a request to use the effect may be sent to the remote terminal. Similarly, the remote terminal may also use their "select effect" window to choose effects for the local user's face in the video, thereby requesting the local terminal to perform the first operation. Because both the local user and the remote user can control the local terminal to perform the first operation, in a scenario where the first operation is mutually exclusive, it may create a game effect of effect competition between both parties, enhancing the flexibility of gameplay.

In FIG. 2, the first operation that has taken effect at the local terminal is to add special effects such as cat ears to the face in the local user's video. In addition, other operations may be performed, including adjusting makeup and adding atmosphere special effects (such as floating heart and snow), which is not exhaustive here.

In these embodiments, the multimedia communication client may perform the operation of adding special effects to the multimedia data, so that the same multimedia resources may be operated in the multi-person interaction scenario, and the interactive effect may be improved. In addition, other business scenarios in which multiple clients operate on the same object may also be applied to support business scalability.

S120: reporting an effective message to a server in response to the performing of the first operation taking effect, to trigger the server to generate a notification message, and trigger the notification message to be sent to the first client and at least one second client that is in real-time communication with the first client, to enable the first client to maintain the first operation that has taken effect, and to enable the at least one second client to perform the first operation on the first object.

In the embodiments of the present disclosure, the performing of the first operation taking effect may refer to the completion of the first operation on the first client and the presentation of its completed effect. The first client and at least one second client may communicate through a server. In response to the first operation performed by the first client taking effect, an effective message may be generated and reported to the server. The effective message may include, but is not limited to, data such as the identifier of the first client, the identifier of the communication range to which the first client belongs (e.g., the identifier of a chat group, the identifier of a video conference room, etc.), the identifier of the first object within the first client, and the identifier of the first operation.

For example, the server may generate a notification message based on the received effective message. For example, the identifier of the first client from the generated message may be used as the identifier of the client to be operated in the notification message; the identifier of the communication range to which the first client belongs from the generated message may be used as the identifier of the communication range to be notified in the notification message; and the identifier of the first object within the first client and the identifier of the first operation from the generated message may be used as the identifier of the first object within the client to be operated and the identifier of the first operation in the notification message. After generating the notification message, the server may send the notification message to all clients within the corresponding communication range based on the identifier of the communication range to be notified in the notification message, i.e., to the first client and at least one second client that is in real-time communication with the first client.

By sending the notification message to the second client, the second client may perceive that the first client has performed the first operation on the first object. Because the second client also presents the first object of the first client, the second client may perform the first operation on the presented first object based on the notification message. Therefore, the same operation behavior may be performed on multiple terminals within the communication range, the order of global operation behavior is guaranteed, the object states presented by multiple terminals are consistent, and the interactive effect is improved. By sending the notification message to the first client, the first client may receive the feedback that the first operation is also effective at the second client, thus improving the interactive effect.

Figure 3:
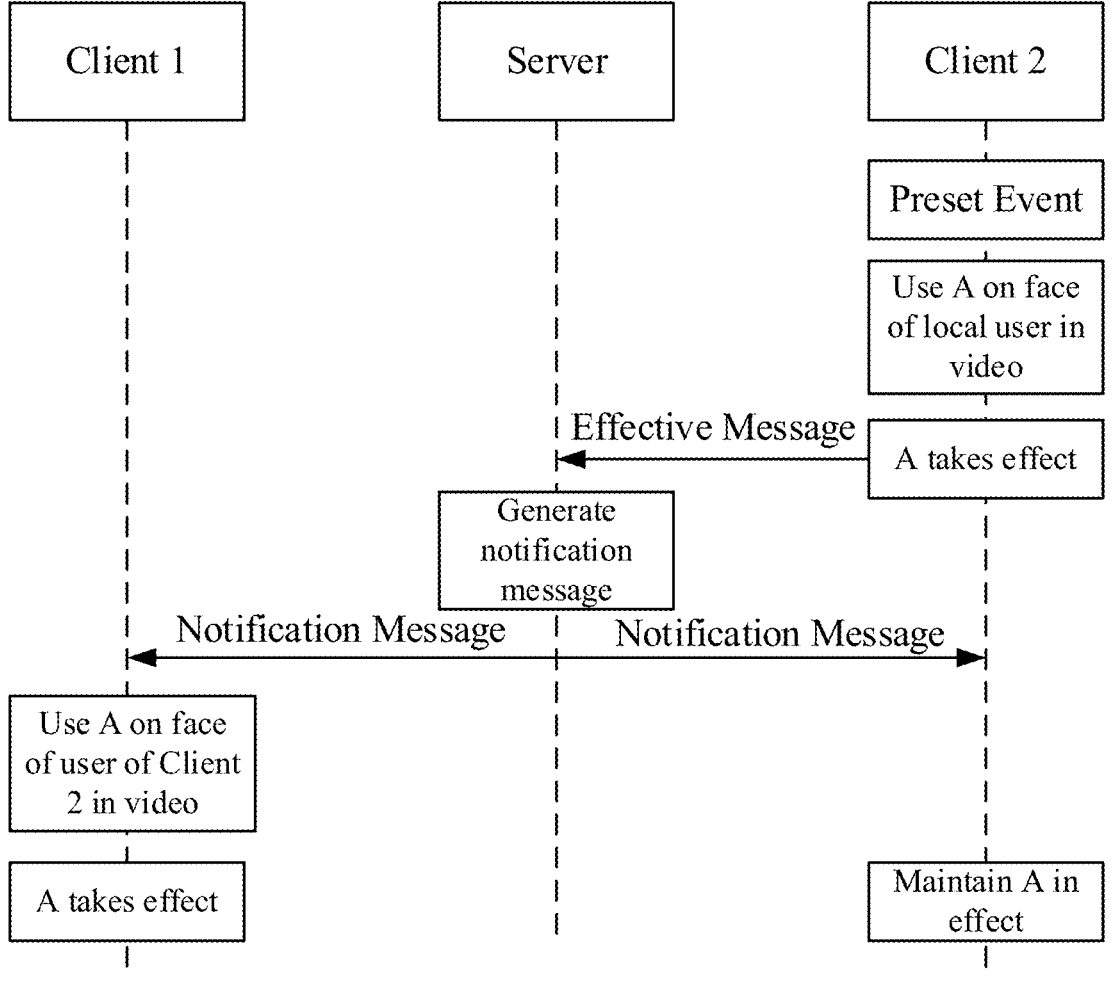
FIG. 3 is a schematic signaling diagram of an operation method for an object provided by an embodiment of the present disclosure.

Exemplarily, FIG. 3 is a schematic signaling diagram of an operation method for an object provided by an embodiment of the present disclosure. Referring to FIG. 3, the first client (Client 2 in the figure) may communicate with at least one second client (Client 1 in the figure) through a server. In response to a preset event, Client 2 may use Effect A on the face of the local user in the video (that is, perform the first operation on the first object). For example, during the process of using effects, it may be judged whether the effect has been downloaded, if the effect has been downloaded, it may be used directly; and if the effect has not been downloaded, it may be downloaded before use. Client 2 may report an effective message to the server in response to Effect A taking effect. The server may generate a notification message according to the effective message. The server may further send the notification message to Client 1 and Client 2.

By sending the notification message to Client 1, it may be realized that Client 1 also uses Effect A on the face of the user of Client 2 as presented in the video, which ensures the order of the global operation behavior, makes the facial state of the user of Client 2 presented by multiple terminals consistent in the video, and improves the interactive effect. By sending the notification message to Client 2, it provides feedback to Client 2 that the first operation is also effective on Client 1, thereby improving the interactive effect of Client 2.

In an embodiment, in response to determining that the notification message corresponding to the effective message sent by the server is not received within a first time interval from the moment of reporting the effective message, an operation failure message is prompted and the first operation that has taken effect is cancelled.

During the application process of the operation method for an object, due to communication interference, server abnormality and other factors, it may lead to the situation that the notification message cannot be sent smoothly. In these embodiments, the first client may count the time from the moment of sending the effective message. If the notification message is not received within the first time interval, it may be considered that the notification of the server failed, and the first operation is not effective on the second client. The first time interval may be preset according to empirical values or experimental values.

In these embodiments, in response to that the notification message is not received within the first time interval, an operation failure message including "xx operation failed" may be prompted to prompt that the first operation is not effective on other terminals. In addition, the first client may also cancel the first operation that has taken effect, thus ensuring multi-terminal consistency.

According to the technical solutions of the embodiments of the present disclosure, the first client may perform the first operation on the first object of the local client in response to the preset event. The effective message is reported to the server in response to performing of the first operation taking effect, to trigger the server to generate the notification message, and the notification message is sent to the first client and at least one second client that is in real-time communication with the first client, to enable the first client to maintain the first operation that has taken effect, and to enable the second client to perform the first operation on the first object.

Any client that performs communication may be used as the first client. In response to the first operation performed on the first object of the local terminal taking effect, the first client may report the effective message to the server, so that the server may send the notification message to the first client and the second client that is in real-time communication with the first client. Therefore, the second client may also perform the first operation on the first object, which ensures the orderliness of operation behaviors on multiple terminals within the communication range, makes the object states presented by multiple terminals consistent, and improves the interactive effect. In addition, the first client may receive the feedback that the first operation is also effective on the second client, thus improving the interactive effect.

The embodiment of the present disclosure may be combined with a plurality of embodiments of the operation method for an object provided by the above-mentioned embodiments. The operation method for an object provided by the present embodiment describes the preset event in detail, and may actively perform the first operation at the local terminal and also perform the first operation in response to the request of the second client, so that the object operation is more flexible, the interactive gameplay is more diverse, and the interactive effect may be improved.

In an embodiment, the preset event includes at least one of the following: receiving an operation instruction input to the first client; or providing feedback with an approval message for a first request sent by any second client, in which the first request represents a request to perform the first operation on the first object.

Figure 4:
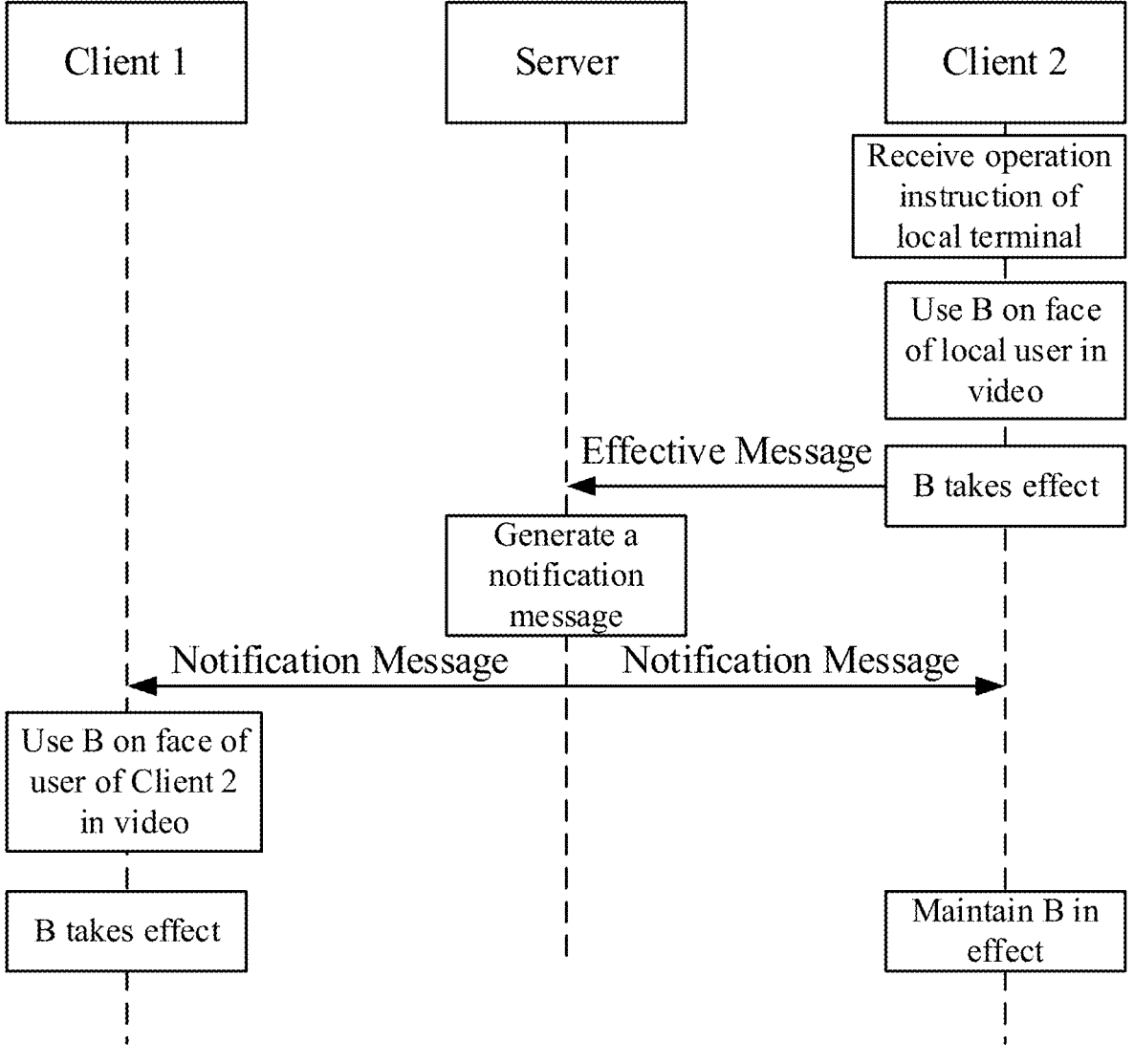
FIG. 4 is a schematic signaling diagram of active switching of effects by a local terminal in an operation method for an object provided by an embodiment of the present disclosure.

Exemplarily, FIG. 4 is a schematic signaling diagram of active switching of effects by a local terminal in an operation method for an object provided by an embodiment of the present disclosure.

Referring to FIG. 4, the first client (Client 2 in the figure) may communicate with at least one second client (Client 1 in the figure) through a server. Client 2 may receive an operation instruction input by the local terminal, where the operation instruction may represent an instruction to perform the first operation on the first object of the local terminal, such as an instruction to use Effect B on the face of the local user in the video. Client 2 may use Effect B on the face of the local user in the video (that is, perform the first operation on the first object) according to the operation instruction. Client 2 may report an effective message to the server in response to Effect B taking effect. The server may generate a notification message according to the effective message. The server may also send the notification message to Client 1 and Client 2, to ensure that the facial states of the users of Client 2 presented by multiple terminals are consistent in the video. Therefore, the first client can actively perform the first operation on the first object of the local terminal through the operation instruction input by the local terminal.

Figure 5:
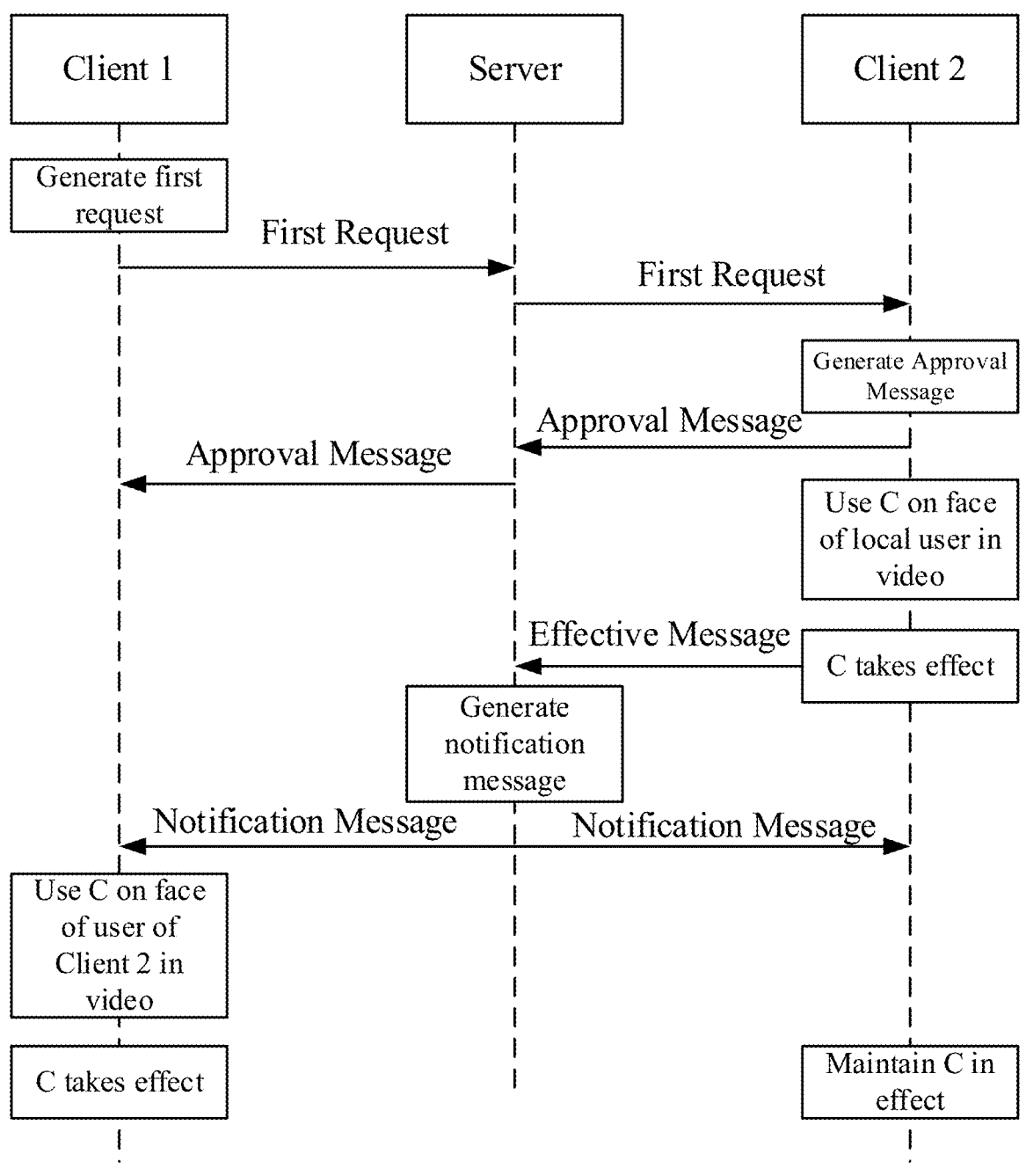
FIG. 5 is a schematic signaling diagram of requesting a local terminal to switch the effects by a remote terminal in an operation method for an object provided by an embodiment of the present disclosure.

Exemplarily, FIG. 5 is a schematic signaling diagram of requesting a local terminal to switch the effects by a remote terminal in an operation method for an object provided by an embodiment of the present disclosure.

Referring to FIG. 5, the first client (Client 2 in the figure) may communicate with at least one second client (Client 1 in the figure) through the server. Any Client 1 may generate the first request and send the first request to Client 2 through the server; and the first request represents a request to perform the first operation on the first object, such as using Effect C on the face of the user of Client 2 in the video. Client 2 may generate an approval message according to an approval instruction input by the user, and provide feedback with the approval message, through the server, to Client 1 that sent the first request. In response to providing feedback with the approval message, Client 2 may use Effect C on the face of the local user in the video (that is, perform the first operation on the first object). Client 2 may report an effective message to the server in response to Effect C taking effect. The server may generate a notification message according to the effective message. The server may also send the notification message to Client 1 and Client 2, to ensure that the facial states of the users of Client 2 presented by multiple terminals are consistent in the video. Therefore, by providing feedback with the approval message in response to the request of the second client, the first client can passively perform the first operation on the first object of the local terminal.

In some other implementations, after receiving the first request, Client 2 may also generate a rejection message according to a rejection instruction input by the user, and provide feedback with the rejection message, through the server, to Client 1 that sent the first request. Client 1 may display the received rejection message to prompt the user that the request is rejected. In this case, Client 2 may not need to perform the first operation on the first object, thus meeting the requirement of Client 2 to reject the first request and further improving the interactive effect of Client 2.

According to the technical solutions of the embodiments of the present disclosure, the preset event is described in detail, and the first operation may be actively performed on the local terminal and may also be performed in response to the request of the second client, so that the object operation is more flexible, the interactive gameplay is more diverse, and the interactive effect may be improved. The operation method for an object provided by the embodiment of the present disclosure belongs to the same concept as the operation method for an object provided by the above-mentioned embodiments, and the technical details not described in detail in the present embodiment may refer to the above-mentioned embodiments, and the same technical features have the same beneficial effects in the present embodiment and the above-mentioned embodiments.

The embodiment of the present disclosure may be combined with a plurality of embodiments of the operation method for an object provided by the above-mentioned embodiments. The operation method for an object provided by the present embodiment refines the situation that the local terminal frequently operates the first object and reports the effective message. By maintaining a first operation number internally within the client, the server may send the notification message based on the last effective message according to the order in response to the effective message being frequently reported, thus ensuring the consistency of multi-terminal final operation and avoiding the situation of timing error caused by frequent operations.

In an embodiment, the effective message includes a first operation number within the first client.

For example, the first operation number may refer to the arrangement order of the operations performed by the local terminal from the perspective of any client within the communication range, and the operations performed by the local terminal may include the first operation performed on the first object. For example, the first operation number may be increased by the local terminal or the server. By maintaining the first operation number within the first client, the absolute order of the operations performed in the local perspective can be guaranteed.

In response to determining that a reporting time interval between every adjacent two of at least two effective messages is less than a second time interval, triggering the server to generate the notification message includes triggering the server to generate the notification message based on the last effective message sorted by the first operation number among the at least two effective messages.

During the application process of the operation method for an object, there may be the case where the first client frequently performs the first operation on the first object. If the reporting time interval between every adjacent two of two or more effective messages reported by the first client is less than the second time interval, it may be considered that the first client frequently performs operations on the first object. For example, the second time interval may be preset according to empirical values or experimental values.

In response to the first client frequently performing the first operation on the first object, the server will frequently receive the reported effective message. Due to the influence of communication delay and other factors, the order of effective messages received by the server may be different from the order of effective messages sent by the first client.

In these embodiments, the server may determine the order in which the first client performs the first operation according to the first operation number included in the effective message, that is, determine the order in which the first client sends the effective message. In addition, the server may also generate the notification message based on the last effective message sorted by the first operation number, thus ensuring the consistency of multi-terminal final operations and avoiding the situation of timing error caused by frequent operations.

Figure 6:
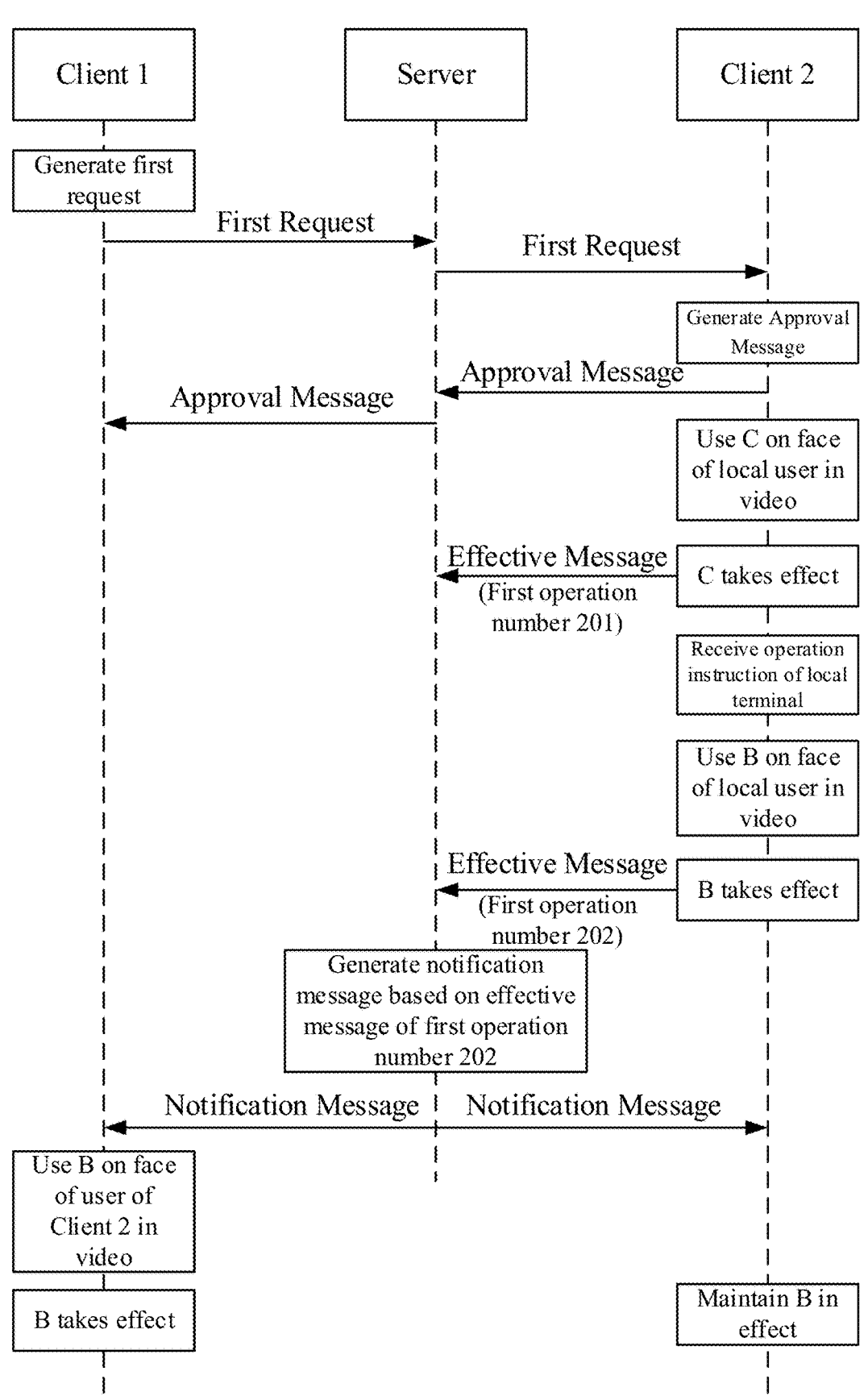
FIG. 6 is a schematic signaling diagram of continuously reporting an effective message in an operation method for an object provided by an embodiment of the present disclosure.

Exemplarily, FIG. 6 is a schematic signaling diagram of continuously reporting an effective message in an operation method for an object provided by an embodiment of the present disclosure.

FIG. 6 may be regarded as the combination of the operation methods for an object provided by FIG. 4 and FIG. 5, and the technical details not elaborated here may refer to the corresponding descriptions of FIG. 4 and FIG. 5. Referring to FIG. 6, the first client (Client 2 in the figure) may communicate with at least one second client (Client 1 in the figure) through a server. First, Client 2 may receive the first request of any Client 1; use Effect C on the face of the local user in the video in response to providing feedback with an approval message; and report the effective message with the first operation number 201 to the server. After that, Client 2 may immediately receive an operation instruction input by the local terminal; use Effect B on the face of the local user in the video according to the operation instruction; and report the effective message with the first operation number 202 to the server.

If the reporting time interval between the effective message carrying the first operation number 201 and the effective message carrying the first operation number 202 is less than the second time interval, the server may discard the effective message carrying the first operation number 201 in order, and generate a notification message according to the effective message carrying the first operation number 202. In this case, from the perspective of Client 2, the effects used on the face of the user of Client 2 in the video are C and B in turn; and from the perspective of Client 1, the effect used on the face of the user of Client 2 in the video is B, thus ensuring the consistency of the multi-terminal final operations, and avoiding the situation of timing error caused by frequent operations.

According to the technical solutions of the embodiments of the present disclosure, the situation that the local terminal frequently operates the first object and reports the effective message is refined. By maintaining the first operation number within the client, in response to the effective messages being frequently reported, the server can send the notification message according to the last effective message sorted by the first operation number, thus ensuring the consistency of the multi-terminal final operations and avoiding the situation of timing error caused by frequent operations. The operation method for an object provided by the embodiment of the present disclosure belongs to the same concept as the operation method for an object provided by the above-mentioned embodiments, and the technical details not described in detail in the present embodiment may refer to the above-mentioned embodiments, and the same technical features have the same beneficial effects in the present embodiment and the above-mentioned embodiments.

The embodiment of the present disclosure may be combined with a plurality of embodiments of the operation method for an object provided by the above-mentioned embodiments. The operation method for an object provided by the present embodiment describes in detail the steps of requesting the second client to perform operations.

In an embodiment, the operation method for an object may further include: determining a target client from at least one second client; and sending a second request to the target client, so that in response to the target client providing feedback with an approval message for the second request, a second operation is performed on a second object of the target client, where the second request represents a request to perform the second operation on the second object.

From the perspective of the first client, the object of the second client may be referred to as the second object, and the operation, performed by the client to which the second object belongs, on the second object may be referred to as the second operation. The first client may select the target client from the second clients within the communication range according to a selection instruction input by the user; and send the second request to the target client to request the target client to perform the second operation on the second object.

The target client may provide feedback with an approval message or a rejection message. The process of the target client providing feedback with an approval message or a rejection message may refer to the process of the first client providing feedback with an approval message or a rejection message for the first request.

In response to the target client providing feedback with an approval message, the target client may perform the second operation on its second object; and in response to the second operation taking effect, an effective message may be reported to the server to trigger the server to generate a notification message, and the notification message may be sent to the clients within the communication range to which the target client belongs, so that the target client may maintain the first operation that has taken effect and other clients excluding the target client (including the first client) within the communication range may perform the second operation on the second object.

Figure 7:
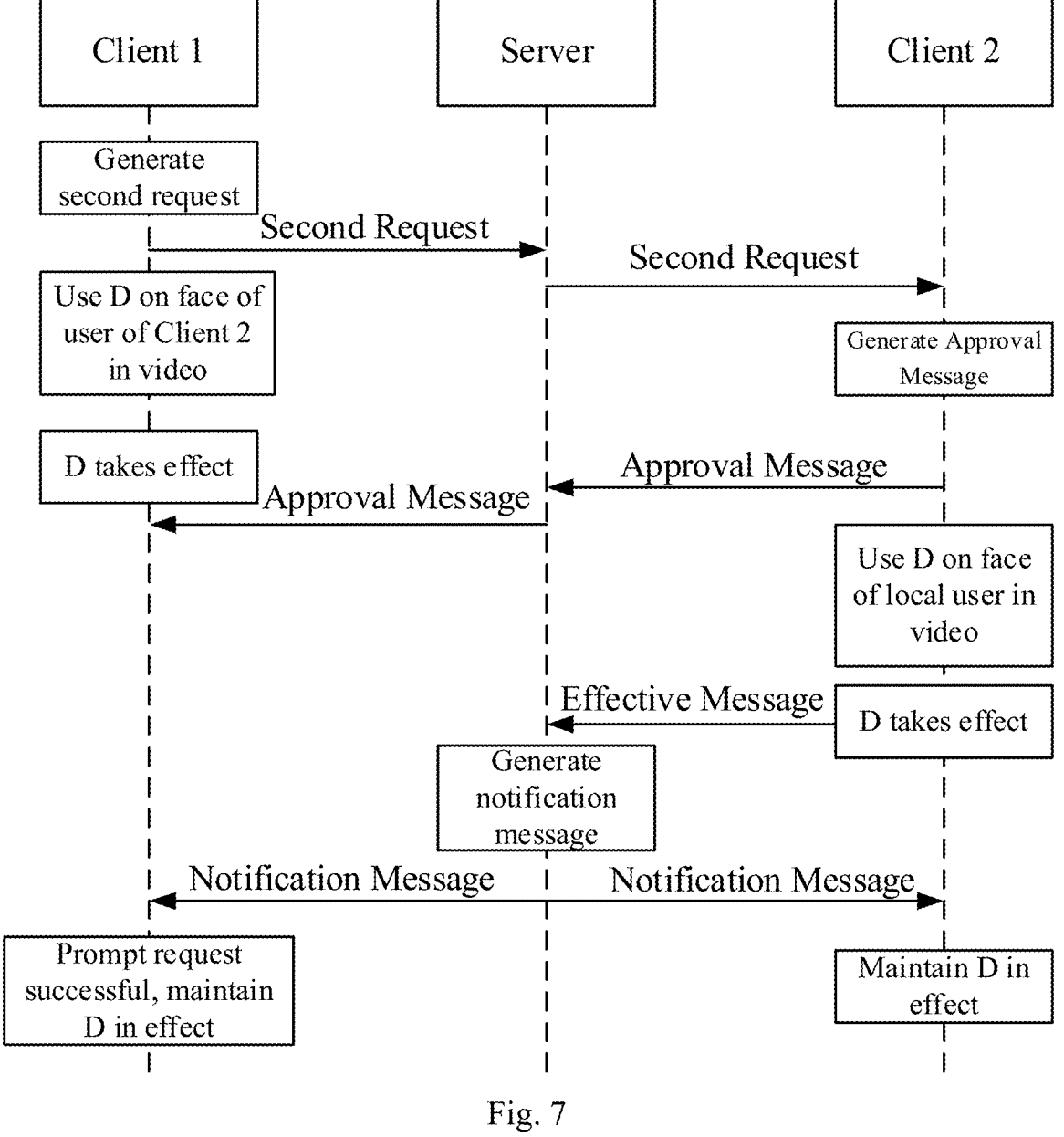
FIG. 7 is a schematic signaling diagram of sending a second request in an operation method for an object provided by an embodiment of the present disclosure.

Exemplarily, FIG. 7 is a schematic signaling diagram of sending a second request in an operation method for an object provided by an embodiment of the present disclosure.

Referring to FIG. 7, the first client (Client 1 in the figure) may communicate with the target client (Client 2 in the figure) through a server. Client 1 may generate a second request and send the second request to Client 2 through the server. The second request represents a request to perform the second operation on the second object, such as using Effect D on the face of the user of Client 2 in the video. Client 2 may generate an approval message according to an approval instruction input by the user, and provide feedback with the approval message to Client 1 through the server. In response to providing feedback with the approval message, Client 2 may use Effect D on the face of the local user in the video (that is, perform the second operation on the second object). Client 2 may report an effective message to the server in response to Effect D taking effect. The server may generate a notification message according to the effective message. The server may also send the notification message to Client 1 and Client 2, to ensure that the facial states of the users of Client 2 presented by multiple terminals are consistent in the video.

In addition, in response to Client 2 providing feedback with a rejection message, Client 2 may not need to perform the second operation on the second object. In this case, Client 1 cannot receive the notification message sent by the server corresponding to the second operation, and may not perform the second operation on the second object, to ensure that the facial states of the users of Client 2 presented by multiple terminals are consistent in the video.

In these embodiments, by sending the second request to the target client, the target client may be requested to perform the second operation on the second object in it, so that the object operation is more flexible, the interactive gameplay is more diverse, and the interactive effect may be improved.

In an embodiment, after sending the second request to the target client, the method further includes: performing the second operation on the second object according to the second request; in response to determining that the notification message corresponding to the second request sent by the server is received within a third time interval from the moment of sending the second request, prompting a request success message, and maintaining an effective second operation; and in response to determining that the notification message corresponding to the second request sent by the server is not received within the third time interval from the moment of sending the second request, prompting a request failure message, and canceling the effective second operation.

For example, after sending the second request, the second operation may be performed on the second object at the local terminal immediately. For example, referring to FIG. 7 again, after Client 1 sends the second request, Client 1 may immediately use Effect D on the face of the user of Client 2 in the video and take effect, thereby allowing the user of Client 1 to perceive timely operation feedback, and improving the interactive effect.

The third time interval may be set according to empirical values or experimental values. For example, the notification message corresponding to the second request may refer to the notification message sent to the server in response to the target client performing the second operation on the second object after providing feedback with an approval message in response to the second request, and upon the second operation taking effect.

The first client may count the time from the moment of sending the second request. If the notification message corresponding to the second request sent by the server is received within the third time interval, it may be considered that the request is successful and the target client has performed the second operation on its second object. In this case, a request success message including content such as "xx client has been successfully requested to perform xx operation" may be prompted, and the effective second operation may be maintained (as shown in FIG. 7).

If the first client does not receive the notification message corresponding to the second request sent by the server within the third time interval, it may be considered that the request is failed and the target client does not perform the second operation on its second object. In this case, a request failure message including content such as "requesting xx client to perform xx operation failed" may be prompted, and the effective second operation may be cancelled at the same time.

Similarly, if the target client does not receive the notification message corresponding to the second operation within the first time interval, an operation failure message including content such as "XX operation failed" may be prompted to prompt the target client that the second operation is not effective at other terminals. In addition, the target client may also cancel the effective second operation, thus ensuring multi-terminal consistency.

In these embodiments, the second operation may be performed on the second object at the local terminal after the second request is sent, so that the user may perceive timely operation feedback. In response to the target client providing feedback with an approval message, the target client may perform the second operation on the second object, and send an effective message of the second operation to the server to trigger the server to send a notification message to at least one client. Furthermore, the first client may determine that the request is successful according to the notification message, and maintain the effective second operation. In response to the target client providing a rejection feedback, or the notification message from the server being not received within a certain time interval due to the interference of various factors during the communication process, it may be considered that the request is failed and the effective second operation is cancelled, thereby ensuring multi-terminal consistency.

In an embodiment, the second request includes a first operation number within the first client.

The first operation number is identical to the first operation number mentioned above, and both of them may refer to the arrangement order of the operations performed by the local terminal from the perspective of any client within the communication range. The operations performed by the local terminal here may include the operation of sending the second request.

In response to determining that the sending time interval between every adjacent two of at least two second requests is less than a fourth time interval, sending the second request to the target client includes forwarding the last second request sorted by the first operation number among the at least two second requests to the target client by the server.

During the application process of the operation method for an object, there may be the case where the first client frequently sends the second request due to accidental touch and other reasons. If the sending time interval between every adjacent two of two or more second requests sent by the first client is less than the fourth time interval, it may be considered that the first client frequently sends the second request. The fourth time interval may be preset according to empirical values or experimental values.

In response to the first client frequently sending the second request, the server may determine the order in which the first client sends the second request according to the first operation number included in the second request. Moreover, the server may also forward the last second request sorted by the first operation number to the target client, thereby ensuring the consistency of multi-terminal final operations and avoiding the situation of timing error caused by frequent requests.

Figure 8:
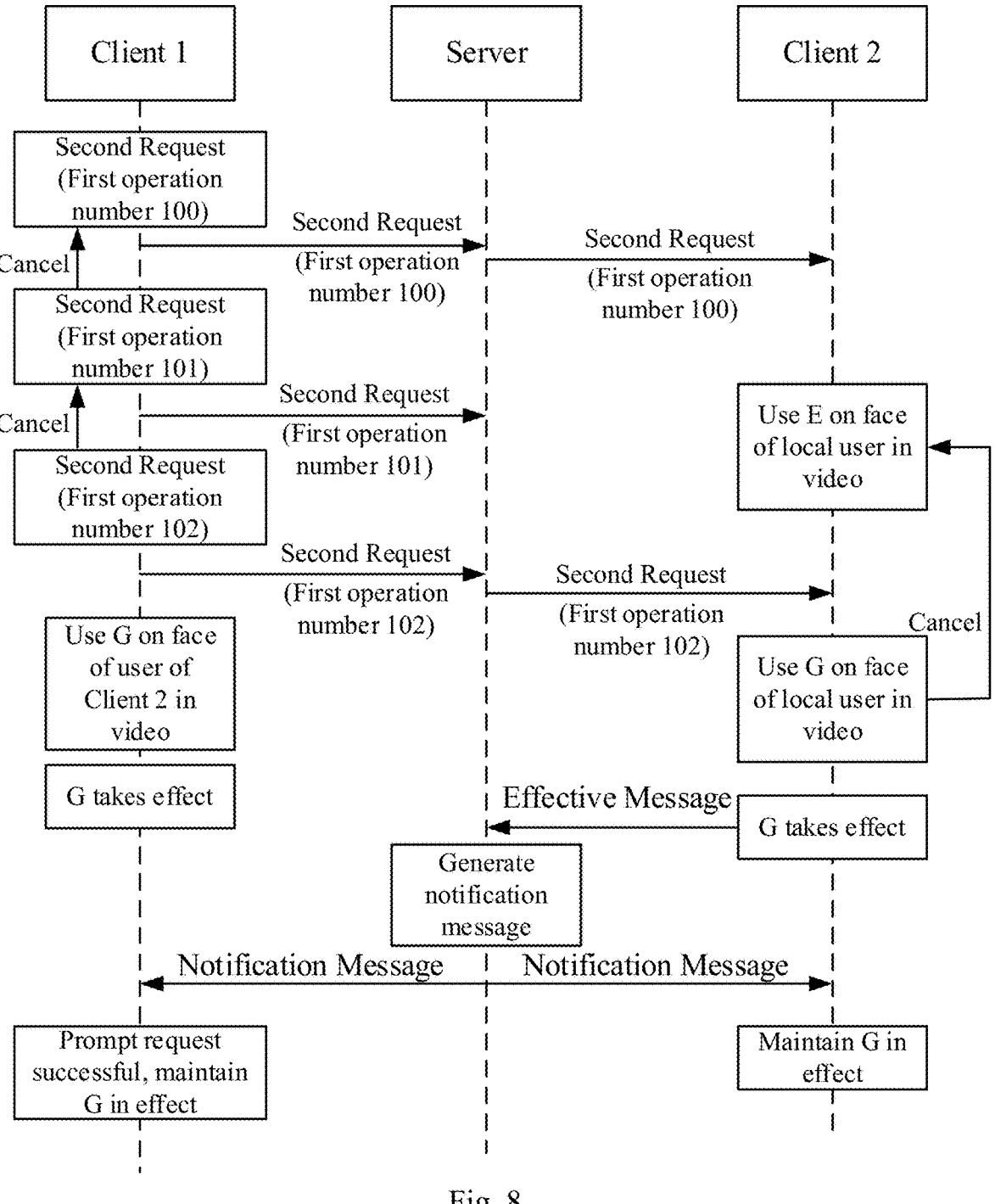
FIG. 8 is a schematic signaling diagram of continuously sending a second request in an operation method for an object provided by an embodiment of the present disclosure.

Exemplarily, FIG. 8 is a schematic signaling diagram of continuously sending a second request in an operation method for an object provided by an embodiment of the present disclosure.

Referring to FIG. 8, the first client (Client 1 in the figure) may communicate with the target client (Client 2 in the figure) through a server. Client 1 may continuously generate three second requests, which may be as follows: the first second request, which carries a first operation number 100, requests to use Effect E on the face of the user of Client 2 in the video; the second second request, which carries a first operation number 101, requests to use Effect F on the face of the user of Client 2 in the video; and the third second request, which carries a first operation number 102, requests to use Effect G on the face of the user of Client 2 in the video.

Moreover, after each second request is generated, the second request may be sent to the server. Because the server can't know whether the second request is continuously received after receiving the first second request, the server may forward the first second request to Client 2. In response to the second second request and the third second request being received in sequence, the second second request carrying the first operation number 101 may be discarded in order, and the second request carrying the first operation number 102 may be forwarded to Client 2.

At this time, from the perspective of Client 2, it may be divided into two cases (only the first situation is shown in FIG. 8): in Case 1, if the second request carrying the first operation number 102 is received when Effect E used on the face of the local user in the video is not effective, using Effect E on the face may be cancelled and using Effect G instead; in Case 2, if the second request carrying the first operation number 102 is received only after Effect E used on the face of the local user in the video is effective, the facial effect may be switched to Effect G.

In some embodiments, Client 1 may immediately perform the corresponding operation at the local terminal every time the second request is sent. In response to a plurality of second requests being sent continuously, for every two adjacent second requests, the operation corresponding to the second request with a lower first operation number may be cancelled, and the operation corresponding to the second request with a higher first operation number may be performed. In these embodiments, from the perspective of Client 1, Effects E, F and G may be used on the face of the user of Client 2 in the video in sequence. After that, it may wait to receive the notification message sent by the server, to determine the effect finally used on the face of the user of Client 2 in the video.

If it is Case 1 from the perspective of Client 2, Client 1 may then receive a notification message, sent from the server, of using Effect G on the face of the user of Client 2 in the video; in this case, Client 1 only needs to keep using Effect G on the face of the user of Client 2 in the video. If it is Case 2 from the perspective of Client 2, Client 1 may first receive a notification message, sent from the server, of using Effect E on the face of the user of Client 2 in the video, and then receive a notification message, sent from the server, of using Effect G on the face of the user of Client 2 in the video. In this case, Client 1 may switch from using Effect G to using Effect E, and then switch back to using Effect G, thereby ensuring the consistency of multi-terminal final operations and avoiding the situation of timing error caused by frequent requests.

In the technical solutions of the embodiments of the present disclosure, the steps of requesting the second client to perform operations are described in detail. By sending the second request to the target client, the target client may be requested to perform the second operation on the second object internally within the target client, so that the object operation is more flexible, the interactive gameplay is more diverse, and the interactive effect may be improved. In addition, after sending the second request, the second operation may be performed on the second object at the local terminal, so that the user may perceive the timely operation feedback. In response to the target client providing feedback with an approval message, the target client may perform the second operation on the second object, and send an effective message of the second operation to the server to trigger the server to send a notification message to at least one client. Furthermore, the first client may determine that the request is successful according to the notification message, and maintain the effective second operation. In response to the target client providing a rejection feedback, or the notification message from the server being not received within a certain time interval due to the interference of various factors during the communication process, it may be considered that the request is failed and the effective second operation is cancelled. Moreover, the second request may also include the first operation number, which enable the server to forward the last second request to the target client in response to sending the second request frequently, thereby ensuring the consistency of multi-terminal final operations and avoiding the situation of timing error caused by frequent requests.

In addition, the operation method for an object provided by the embodiment of the present disclosure belongs to the same concept as the operation method for an object provided by the above-mentioned embodiments, and the technical details not described in detail in the present embodiment may refer to the above-mentioned embodiments, and the same technical features have the same beneficial effects in the present embodiment and the above-mentioned embodiments.

The embodiment of the present disclosure may be combined with a plurality of embodiments of the operation method for an object provided by the above-mentioned embodiments. The operation method for an object provided by the present embodiment refines the object operation steps when frequently receiving notification messages for the same target object. By maintaining the second operation number within the server and making the notification message carry the second operation number, the first client may perform operations on the target object according to the notification message when frequently receiving the notification message, thereby ensuring the consistency of the multi-terminal final operations and avoiding the situation of timing error caused by frequently receiving the notification message.

In an embodiment, the notification message includes the second operation number within the server.

The second operation number may refer to the arrangement order of the global operations in which the client performs the first operation on the first object inside the client from the perspective of the server. For example, the second operation number may be maintained increasingly by the server according to the effective message reported by the client. By maintaining the second operation number within the server and enabling the notification message to carry the second operation number, it may ensure that the operations performed by multiple clients within the communication range according to the notification message may be globally ordered.

In response to determining that a sending time interval between every adjacent two of at least two notification messages for the same target object is less than a fifth time interval, the method further includes performing an operation on the target object according to the last notification message sorted by the second operation number among the at least two notification messages.

During the application process of the operation method for an object, due to the influence of various factors such as communication congestion and server abnormality, blocked notification messages may be sent together. In these embodiments, after receiving the notification message sent by the server, any client within the communication range may determine the target object corresponding to the notification message according to the identifier of the first object in the client to be operated in the notification message. In response to the client receiving multiple notification messages for the same target object, if the sending time interval of every two adjacent messages is less than the fifth time interval, it may be considered that blocked messages are sent together. The fifth time interval may be preset according to empirical values or experimental values.

In this case, the client may determine the identifier of the first operation in the client to be operated according to the last notification message sorted by the second operation number among the at least two notification messages. Moreover, the corresponding operation may be performed on the target object according to the identifier of the first operation in the client to be operated, thereby ensuring the consistency of multi-terminal final operations and avoiding the situation of timing error caused by frequently receiving notification messages.

Figure 9:
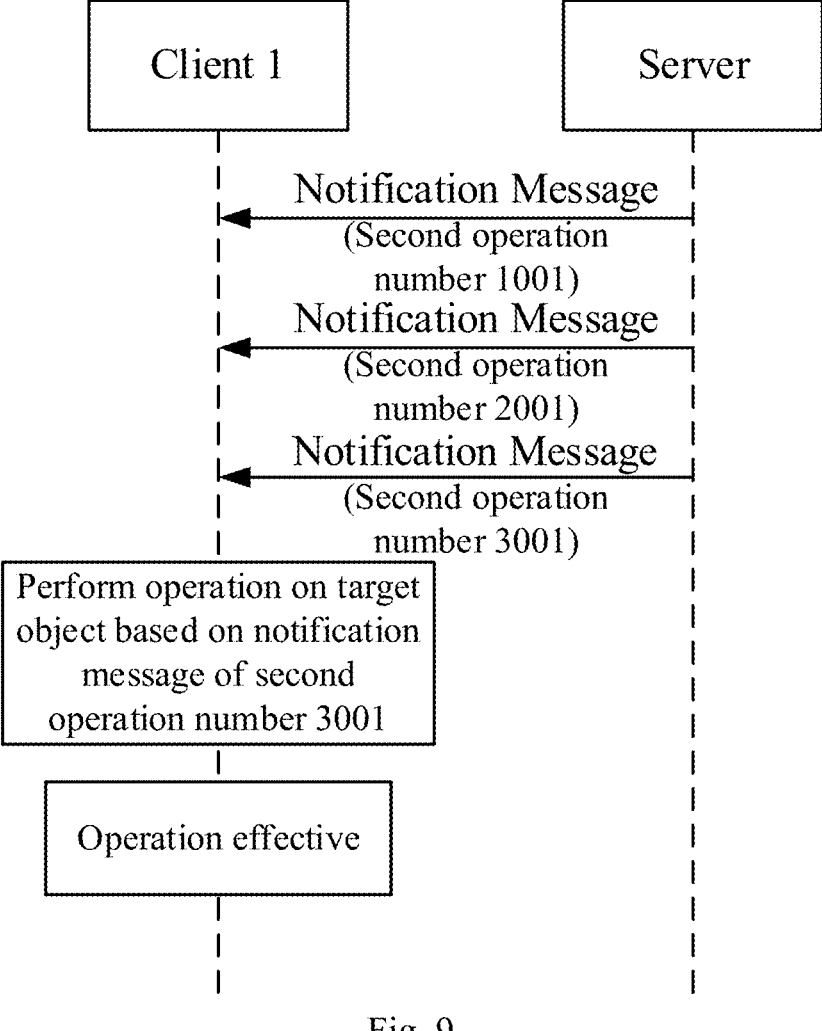
FIG. 9 is a schematic signaling diagram of continuously receiving a notification message in an operation method for an object provided by an embodiment of the present disclosure.

Exemplarily, FIG. 9 is a schematic signaling diagram of continuously receiving a notification message in an operation method for an object provided by an embodiment of the present disclosure. Referring to FIG. 9, the first client (Client 1 in the figure) may be any client within the communication range, and may communicate with the second client through the server. Client 1 may receive the notification message sent by the server, and may determine the target object corresponding to the notification message according to the identifier of the first object in the client to be operated in the notification message.

In FIG. 9, Client 1 receives three notification messages all aimed at the same target object, the sending time interval of every two adjacent notification messages is less than the fifth time interval, and second operation numbers carried by the three notification messages are 1001, 2001 and 3001, respectively. Therefore, Client 1 may discard the notification messages with the second operation numbers of 1001 and 2001 in order, and perform the operation on the target object according to the notification message with the second operation number of 3001, thereby ensuring the consistency of the multi-terminal final operations.

In addition, in order to implement the operation method for an object provided by the embodiments of the present disclosure, a multifunctional interface may be predefined based on programming languages such as C++. For example, the interface may include, for example, an interface for operating behaviors, an interface for operating effect messages, an interface for notifying messages of the client, and the like.

Exemplarily, the interface (Operation) for operating behaviors of the client may be defined with at least one of the following fields: communication range of string type (for example, chat room identifier room_id), first operation number of long integer type (op_id), preset event of integer type (op_type, for example, the number 1 may indicate receiving the operation instruction input by the local terminal, the number 2 may indicate a feedback message for the first request, etc.), business type of the first operation of integer type (business_type, for example, the number 1 may indicate using effects on the face of the user in the video, etc.), specific business data typical of dictionary-type (data), target user of string type (to_user_id), first request feedback message of integer type (reply_result, for example, the numbers 0 and 1 respectively indicate providing feedback with an approval message and a rejection message for the first request), and first request of feedback message of long integer (reply_op_id, which may indicate the first request corresponding to the feedback message). Among them, the specific business is judged and distinguished by defining business_type, and the business data is transmitted in specific data, which may be understood and used by the corresponding business, so that the interface Operation itself does not need to care about the specific business and supports the scalability of the business.

Exemplarily, the interface (apply Effect Message) for operating effect messages may be defined with at least one of the following fields: operation type of integer type (type, for example, the number 1 may indicate actively using effects, and the number 2 may indicate the request of the target client to use effects) and effect identifier of string type (effect_id, for example, an identifier of effect).

Exemplarily, the interface (operation Notify) for notifying messages may be defined with at least one of the following fields: first operation number of long integer type (op_id), second operation number of long integer type (version), preset event of integer type (op_type), business type of the first operation of integer type (business_type), specific business data of dictionary-type (data), source user identifier (from_user_id), first request feedback message of integer type (reply_result), first request of feedback message of long integer type (reply_op_id), and communication range of string type (such as room_id). Among them, the fields not specifically described may refer to the fields of the above-mentioned interface.

According to the technical solutions of the embodiments of the present disclosure, the object operation steps when the notification message for the same target object is frequently received are refined. By maintaining the second operation number within the server and enabling the notification message to carry the second operation number, the first client may perform the operation on the target object according to the notification message when frequently receiving the notification message, thereby ensuring the consistency of the multi-terminal final operations and avoiding the timing error caused by frequently receiving the notification message. The operation method for an object provided by the embodiment of the present disclosure belongs to the same concept as the operation method for an object provided by the above-mentioned embodiments, and the technical details not described in detail in the present embodiment may refer to the above-mentioned embodiments, and the same technical features have the same beneficial effects in the present embodiment and the above-mentioned embodiments.

Figure 10:
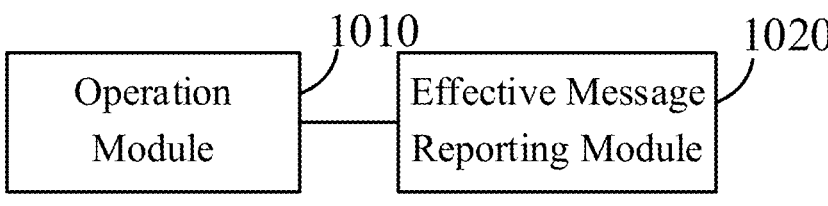
FIG. 10 is a schematic structural diagram of an operation apparatus for an object provided by an embodiment of the present disclosure.

FIG. 10 is a schematic structural diagram of an operation apparatus for an object provided by an embodiment of the present disclosure. The operation apparatus for an object provided by the present embodiment is applicable to the situation that multiple clients perform mutually exclusive operations on the same object, for example, the situation that multiple clients add special effects to multimedia data of a certain client during the process of multimedia communication.

As shown in FIG. 10, the operation apparatus for an object provided by the present embodiment is integrated in a first client, and may include:

an operation module 1010, which is configured to perform a first operation on a first object of the first client in response to a preset event; and an effective message reporting module 1020, which is configured to report an effective message to a server in response to performing of the first operation taking effect, to trigger the server to generate a notification message, and trigger the notification message to be sent to the first client and at least one second client that is in real-time communication with the first client, to enable the first client to maintain the first operation that has taken effect, and to enable the at least one second client to perform the first operation on the first object.

In an embodiment, the operation module 1010 may be further configured to:

in response to determining that the notification message corresponding to the effective message sent by the server is not received within a first time interval from a moment of reporting the effective message, prompt an operation failure message and cancel the first operation that has taken effect.

In an embodiment, the preset event comprises at least one of the following:

receiving an operation instruction input to the first client; or providing feedback with an approval message for a first request sent by any one of the at least one second client, where the first request represents a request to perform the first operation on the first object.

In an embodiment, the effective message may include a first operation number within the first client;

and the effective message reporting module 1020 may be further configured to, in response to determining that a reporting time interval between every adjacent two of at least two effective messages is less than a second time interval, trigger the server to generate the notification message based on the last effective message sorted by the first operation number among the at least two effective messages.

In an embodiment, the operation module 1010 may be further configured to:

determine a target client from at least one second client; and send a second request to the target client, so that in response to the target client providing feedback with an approval message for the second request, a second operation is performed on a second object of the target client, where the second request represents a request to perform the second operation on the second object.

In an embodiment, the operation module 1010 may be further configured to:

after sending the second request to the target client, perform the second operation on the second object according to the second request;

in response to determining that a notification message corresponding to the second request sent by the server is received within a third time interval from the moment of sending the second request, prompt a request success message, and maintain an effective second operation; and in response to determining that the notification message corresponding to the second request sent by the server is not received within the third time interval from the moment of sending the second request, prompt a request failure message, and cancel the effective second operation.

In an embodiment, the second request includes a first operation number within the first client;

and the operation module 1010 may be further configured to, in response to determining that a sending time interval between every adjacent two of at least two second requests is less than a fourth time interval, forward the last second request sorted by the first operation number among the at least two second requests to the target client by the server.

In an embodiment, the notification message includes a second operation number within the server;

and the operation module 1010 may be further configured to, in response to determining that a sending time interval between every adjacent two of at least two notification messages for a same target object is less than a fifth time interval, perform an operation on the target object according to the last notification message sorted by the second operation number among the at least two notification messages.

In an embodiment, the first client and the second client may be multimedia communication clients respectively, the first object includes multimedia data, and the first operation includes an operation of adding a special effect.

The operation apparatus for an object provided by the embodiment of the present disclosure can perform the operation method for an object provided by any embodiment of the present disclosure, and has corresponding functional modules and beneficial effects.

It is worth noting that the units and modules included in the above-mentioned apparatus are only divided according to functional logic, but they are not limited to the above division, as long as the corresponding functions can be realized. In addition, the specific names of multiple functional units are only for the convenience of distinguishing each other, and are not used to limit the protection scope of the embodiments of the present disclosure.

Figure 11:
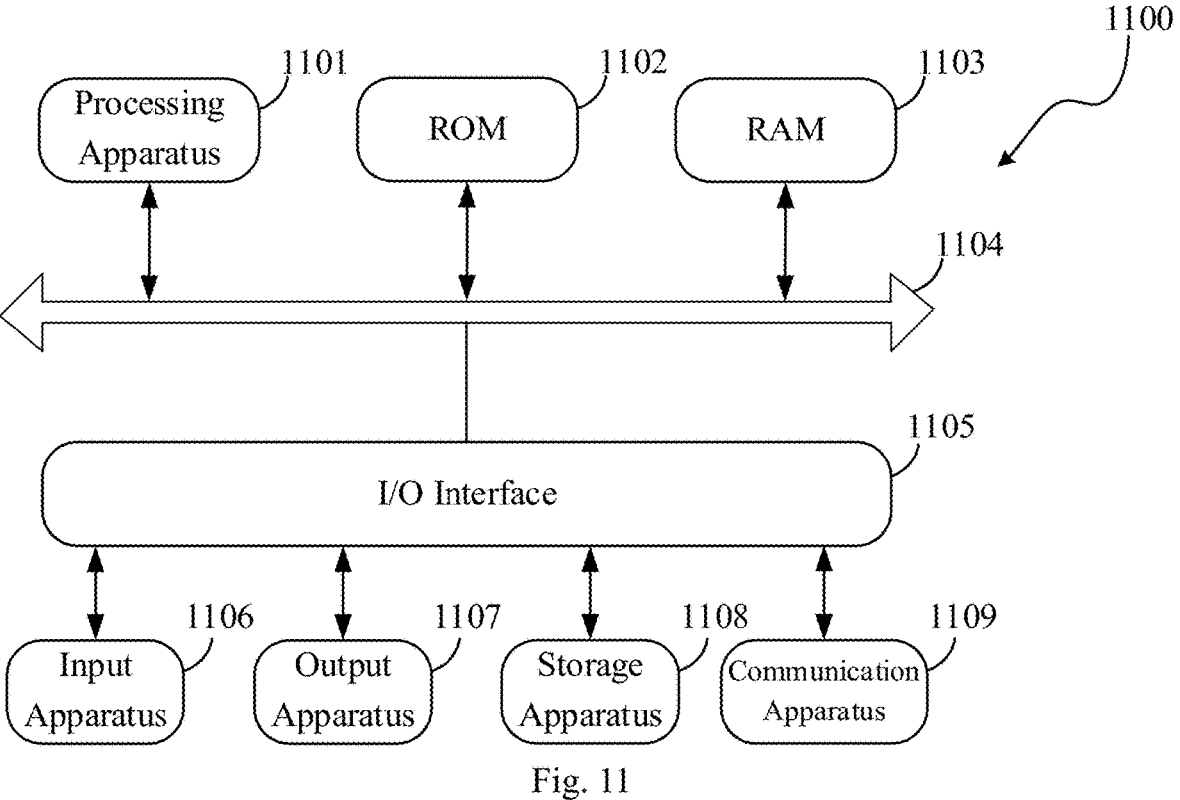
FIG. 11 is a schematic structural diagram of an electronic device provided by an embodiment of the present disclosure.

Referring to FIG. 11, FIG. 11 illustrates a schematic structural diagram of an electronic device 1100 (such as a terminal device or a server) suitable for implementing the embodiments of the present disclosure. The electronic devices in the embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), and fixed terminals such as a digital TV, a desktop computer, or the like. The electronic device illustrated in FIG. 11 is merely an example, and should not pose any limitation to the functions and the range of use of the embodiments of the present disclosure.

As illustrated in FIG. 11, the electronic device 1100 may include a processing apparatus 1101 (e.g., a central processing unit, a graphics processing unit, etc.), which can perform various suitable actions and processing according to a program stored in a read-only memory (ROM) 1102 or a program loaded from a storage apparatus 1108 into a random-access memory (RAM) 1103. The RAM 1103 further stores various programs and data required for operations of the electronic device 1100. The processing apparatus 1101, the ROM 1102, and the RAM 1103 are interconnected through a bus 1104. An input/output (I/O) interface 1105 is also connected to the bus 1104.

Usually, the following apparatuses may be connected to the I/O interface 1105: an input apparatus 1106 including, for example, a touch screen, a touch pad, a keyboard, a mouse, a camera, a microphone, an accelerometer, a gyroscope, or the like; an output apparatus 1107 including, for example, a liquid crystal display (LCD), a loudspeaker, a vibrator, or the like; a storage apparatus 1108 including, for example, a magnetic tape, a hard disk, or the like; and a communication apparatus 1109. The communication apparatus 1109 may allow the electronic device 1100 to be in wireless or wired communication with other devices to exchange data. While FIG. 11 illustrates the electronic device 1100 having various apparatuses, it should be understood that not all of the illustrated apparatuses are necessarily implemented or included. More or fewer apparatuses may be implemented or included alternatively.

According to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 1109 and installed, or may be installed from the storage apparatus 1108, or may be installed from the ROM 1102. When the computer program is executed by the processing apparatus 1101, the above-mentioned functions defined in the methods of some embodiments of the present disclosure are performed.

The electronic device provided by the embodiment of the present disclosure belongs to the same concept as the operation method for an object provided by the above-mentioned embodiments, and the technical details not described in detail in the present embodiment may refer to the above-mentioned embodiments, and the same technical features have the same beneficial effects in the present embodiment and the above-mentioned embodiments.

The embodiments of the present disclosure further provide a computer storage medium on which a computer program is stored. When executed by a processor, the program implements the operation method for an object provided by the above-mentioned embodiments.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

perform a first operation on a first object of the first client in response to a preset event; and report an effective message to a server in response to performing of the first operation taking effect, to trigger the server to generate a notification message, and trigger the notification message to be sent to the first client and at least one second client that is in real-time communication with the first client, to enable the first client to maintain the first operation that has taken effect, and to enable the at least one second client to perform the first operation on the first object.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, Example 1 provides an operation method for an object, which is applied to a first client, and the method includes:

in response to a preset event, performing a first operation on a first object displayed by the current first client, where the first object is associated with the first client or with a second client that is in real-time communication with the first client; and reporting an effective message to a server in response to the performing of the first operation taking effect, to trigger the server to generate a notification message, and trigger the notification message to be sent to the first client within the communication range to which the current client belongs and to at least one second client that is in real-time communication with the first client, to enable the first client to maintain the first operation that has taken effect, and to enable other second client within the communication range, except for the current client, to perform the first operation on the first object.

According to one or more embodiments of the present disclosure, Example 2 provides an operation method for an object, further including:

in response to determining that the notification message corresponding to the effective message sent by the server is not received within a first time interval from a moment of reporting the effective message, prompting an operation failure message and canceling the first operation that has taken effect.

According to one or more embodiments of the present disclosure, Example 3 provides an operation method for an object, and the preset event includes at least one of the following:

receiving an operation instruction input to the first client; or providing feedback with an approval message for a first request sent by any one of the at least one second client, wherein the first request represents a request to perform the first operation on the first object.

According to one or more embodiments of the present disclosure, Example 4 provides an operation method for an object, and the effective message includes a first operation number within the first client;

in response to determining that a reporting time interval between every adjacent two of at least two effective messages is less than a second time interval, triggering the server to generate the notification message includes:

triggering the server to generate the notification message based on a last effective message sorted by the first operation number among the at least two effective messages.

According to one or more embodiments of the present disclosure, Example 5 provides an operation method for an object, further including:

determining a target client from the at least one second client; and sending a second request to the target client, so that in response to the target client providing feedback with an approval message for the second request, a second operation is performed on a second object of the target client;

the second request represents a request to perform the second operation on the second object.

According to one or more embodiments of the present disclosure, Example 6 provides an operation method for an object, and after sending the second request to the target client, the method further includes:

performing the second operation on the second object according to the second request;

in response to determining that a notification message corresponding to the second request sent by the server is received within a third time interval from a moment of sending the second request, prompting a request success message, and maintaining an effective second operation; and in response to determining that the notification message corresponding to the second request sent by the server is not received within the third time interval from the moment of sending the second request, prompting a request failure message, and canceling the effective second operation.

According to one or more embodiments of the present disclosure, Example 7 provides an operation method for an object, and the second request includes a first operation number within the first client;

and in response to determining that a sending time interval between every adjacent two of at least two second requests is less than a fourth time interval, the sending the second request to the target client includes:

forwarding a last second request sorted by the first operation number among the at least two second requests to the target client by the server.

According to one or more embodiments of the present disclosure, Example 8 provides an operation method for an object, and the notification message includes a second operation number within the server;

and in response to determining that a sending time interval between every adjacent two of at least two notification messages for a same target object is less than a fifth time interval, the method further includes:

performing an operation on the target object according to a last notification message sorted by the second operation number among the at least two notification messages.

According to one or more embodiments of the present disclosure, Example 9 provides an operation method for an object, the first client and the second client are multimedia communication clients respectively, the first object comprises multimedia data, and the first operation comprises an operation of adding a special effect.

Furthermore, although various operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments can also be combined in a single embodiment. On the contrary, various features described in the context of a single embodiment can also be implemented in multiple embodiments individually or in any suitable sub-combination.

The invention claimed is:

1. An operation method for an object, applied to a first client, comprising:

performing a first operation on a first object of the first client in real-time communication with at least one second client, wherein the first operation comprises an operation for adding an effect on an image of a user of the first client;

reporting an effective message to a server in response to the performing of the first operation taking effect, to trigger the server to generate a notification message, and trigger the notification message to be sent to the first client and the at least one second client that is in the real-time communication with the first client, to enable the at least one second client to perform the first operation on the first object;

in response to receiving the notification message, maintaining the first operation that has taken effect; and in response to determining that the notification message corresponding to the effective message sent by the server is not received within a first time interval from a moment of reporting the effective message, prompting an operation failure message and canceling the first operation that has taken effect.

2. The method according to claim 1, wherein a preset event comprises at least one of the following:

receiving an operation instruction input to the first client; or providing feedback with an approval message for a first request sent by any one of the at least one second client, wherein the first request represents a request to perform the first operation on the first object.

3. The method according to claim 1, further comprising:

in response to determining that a reporting time interval between every adjacent two of at least two effective messages is less than a second time interval, triggering the server to generate the notification message based on a last effective message among the at least two effective messages, wherein each of the at least two effective messages comprises a first operation number indicative of an order of operations performed by the first client, and the at least two effective messages are sorted based on respective first operation numbers of the at least two effective messages.

4. The method according to claim 1, further comprising:

determining a target client from the at least one second client; and sending a second request to the target client, so that in response to the target client providing feedback with an approval message for the second request, a second operation is performed on a second object of the target client, wherein the second request represents a request to perform the second operation on the second object.

5. The method according to claim 4, after sending the second request to the target client, further comprising:

performing the second operation on the second object according to the second request;

in response to determining that a notification message corresponding to the second request sent by the server is received within a third time interval from a moment of sending the second request, prompting a request success message, and maintaining an effective second operation; and in response to determining that the notification message corresponding to the second request sent by the server is not received within the third time interval from the moment of sending the second request, prompting a request failure message, and canceling the effective second operation.

6. The method according to claim 4, further comprising:

in response to determining that a sending time interval between every adjacent two of at least two second requests is less than a fourth time interval, forwarding a last second request among the at least two second requests to the target client by the server, wherein each of the at least two second requests comprises a first operation number indicative of an order of operations performed by the first client, and the at least two second requests are sorted based on respective first operation numbers of the at least two second requests.

7. The method according to claim 1, further comprising:

in response to determining that a sending time interval between every adjacent two of at least two notification messages for a same target object is less than a fifth time interval, performing an operation on the target object according to a last notification message among the at least two notification messages, wherein each of the at least two notification messages comprises a second operation number that is maintained by the server and indicates an order of global operations performed by clients, and the at least two notification messages are sorted based on respective second operation numbers of the at least two notification messages.

8. The method according to claim 1, wherein the first client and the at least one second client are multimedia communication clients respectively, the first object comprises multimedia data, and the first operation comprises an operation of adding a special effect.

9. An electronic device, comprising:

one or more processors; and a storage apparatus, configured to store one or more programs, wherein the one or more programs, when executed by the one or more processors, enable the one or more processors to implement acts comprising:

performing a first operation on a first object of the first client in real-time communication with at least one second client, wherein the first operation comprises an operation for adding an effect on an image of a user of the first client;

reporting an effective message to a server in response to the performing of the first operation taking effect, to trigger the server to generate a notification message, and trigger the notification message to be sent to the first client and the at least one second client that is in the real-time communication with the first client, to enable the at least one second client to perform the first operation on the first object;

in response to receiving the notification message, maintaining the first operation that has taken effect; and in response to determining that the notification message corresponding to the effective message sent by the server is not received within a first time interval from a moment of reporting the effective message, prompting an operation failure message and canceling the first operation that has taken effect.

10. The electronic device according to claim 9, wherein a preset event comprises at least one of the following:

receiving an operation instruction input to the first client; or providing feedback with an approval message for a first request sent by any one of the at least one second client, wherein the first request represents a request to perform the first operation on the first object.

11. The electronic device according to claim 9, the acts further comprising:

in response to determining that a reporting time interval between every adjacent two of at least two effective messages is less than a second time interval, triggering the server to generate the notification message based on a last effective message among the at least two effective messages, wherein each of the at least two effective messages comprises a first operation number indicative of an order of operations performed by the first client, and the at least two effective messages are sorted based on respective first operation numbers of the at least two effective messages.

12. The electronic device according to claim 9, wherein the acts further comprise:

determining a target client from the at least one second client; and sending a second request to the target client, so that in response to the target client providing feedback with an approval message for the second request, a second operation is performed on a second object of the target client, wherein the second request represents a request to perform the second operation on the second object.

13. The electronic device according to claim 12, wherein after sending the second request to the target client, the acts further comprise:

performing the second operation on the second object according to the second request;

in response to determining that a notification message corresponding to the second request sent by the server is received within a third time interval from a moment of sending the second request, prompting a request success message, and maintaining an effective second operation; and in response to determining that the notification message corresponding to the second request sent by the server is not received within the third time interval from the moment of sending the second request, prompting a request failure message, and canceling the effective second operation.

14. The electronic device according to claim 12, the acts further comprising:

in response to determining that a sending time interval between every adjacent two of at least two second requests is less than a fourth time interval, forwarding a last second request among the at least two second requests to the target client by the server, wherein each of the at least two second requests comprises a first operation number indicative of an order of operations performed by the first client, and the at least two second requests are sorted based on respective first operation numbers of the at least two second requests.

15. The electronic device according to claim 9, the acts further comprising:

in response to determining that a sending time interval between every adjacent two of at least two notification messages for a same target object is less than a fifth time interval, performing an operation on the target object according to a last notification message among the at least two notification messages, wherein each of the at least two notification messages comprises a second operation number that is maintained by the server and indicates an order of global operations performed by clients, and the at least two notification messages are sorted based on respective second operation numbers of the at least two notification messages.

16. The electronic device according to claim 9, wherein the first client and the at least one second client are multimedia communication clients respectively, the first object comprises multimedia data, and the first operation comprises an operation of adding a special effect.

17. A non-transitory storage medium, comprising computer-executable instructions, wherein the computer-executable instructions, when executed by a computer processor, are configured to perform acts comprising:

performing a first operation on a first object of the first client in real-time communication with at least one second client, wherein the first operation comprises an operation for adding an effect on an image of a user of the first client;

reporting an effective message to a server in response to the performing of the first operation taking effect, to trigger the server to generate a notification message, and trigger the notification message to be sent to the first client and the at least one second client that is in the real-time communication with the first client, to enable the at least one second client to perform the first operation on the first object;

in response to receiving the notification message, maintaining the first operation that has taken effect; and in response to determining that the notification message corresponding to the effective message sent by the server is not received within a first time interval from a moment of reporting the effective message, prompting an operation failure message and canceling the first operation that has taken effect.

18. The non-transitory storage medium according to claim 17, the acts further comprising:

in response to determining that a reporting time interval between every adjacent two of at least two effective messages is less than a second time interval, triggering the server to generate the notification message based on a last effective message among the at least two effective messages, wherein each of the at least two effective messages comprises a first operation number indicative of an order of operations performed by the first client, and the at least two effective messages are sorted based on respective first operation numbers of the at least two effective messages.

19. The non-transitory storage medium according to claim 17, the acts further comprising:

determining a target client from the at least one second client; and sending a second request to the target client, so that in response to the target client providing feedback with an approval message for the second request, a second operation is performed on a second object of the target client, wherein the second request represents a request to perform the second operation on the second object.

20. The non-transitory storage medium according to claim 17, the acts further comprising:

in response to determining that a sending time interval between every adjacent two of at least two notification messages for a same target object is less than a fifth time interval, performing an operation on the target object according to a last notification message among 5 the at least two notification messages, wherein each of the at least two notification messages comprises a second operation number that is maintained by the server and indicates an order of global operations performed by clients, and the at least two notification 10 messages are sorted based on respective second operation numbers of the at least two notification messages.

\* \* \* \* \*